US007960652B2

(12) United States Patent
Drew et al.

(10) Patent No.: US 7,960,652 B2
(45) Date of Patent: Jun. 14, 2011

(54) SEALED CABLE AND TERMINAL CRIMP

(75) Inventors: George Albert Drew, Warren, OH (US); Bruce S. Gump, Warren, OH (US); Randall C. Sumner, New Wilmington, PA (US)

(73) Assignee: Delphi Technologies, Inc., Troy, MI (US)

( * ) Notice: Subject to any disclaimer, the term of this patent is extended or adjusted under 35 U.S.C. 154(b) by 146 days.

(21) Appl. No.: 12/286,776

(22) Filed: Oct. 2, 2008

(65) Prior Publication Data

US 2010/0084159 A1 Apr. 8, 2010

(51) Int. Cl.
*H02G 3/02* (2006.01)

(52) U.S. Cl. ........................................ 174/74 R; 174/76

(58) Field of Classification Search ................ 174/74 R, 174/76

See application file for complete search history.

(56) References Cited

U.S. PATENT DOCUMENTS

| | | | | |
|---|---|---|---|---|
| 3,320,665 | A | 5/1967 | Morse | |
| 3,885,380 | A | 5/1975 | Hacker | |
| 4,572,868 | A * | 2/1986 | Hosaka et al. | 428/328 |
| 5,017,160 | A | 5/1991 | Garcia | |
| 5,151,143 | A | 9/1992 | Downie | |
| 5,520,974 | A | 5/1996 | Chiotis et al. | |
| 5,876,528 | A | 3/1999 | Nikkels et al. | |
| 5,888,323 | A | 3/1999 | Yasukuni et al. | |
| 6,080,334 | A * | 6/2000 | Heimann et al. | 252/389.62 |
| 6,291,773 | B1 | 9/2001 | Nikkels et al. | |
| 7,049,506 | B2 | 5/2006 | Head | |
| 7,230,214 | B2 | 6/2007 | Kirby | |
| 7,238,884 | B2 * | 7/2007 | Tanaka et al. | 174/74 R |
| 2002/0022409 | A1 | 2/2002 | Caridei | |
| 2004/0058575 | A1 | 3/2004 | Nicholson | |

* cited by examiner

*Primary Examiner* — Chau N Nguyen

(74) *Attorney, Agent, or Firm* — Thomas N. Twomey

(57) ABSTRACT

A cable includes a plurality of cable strands, an insulator disposed on a portion of the plurality of strands such that the plurality of strands are at least partially exposed, and a sealant disposed between gaps of the plurality of strands and at least partially under the insulator. Moreover, a method includes stripping an insulator from an end of the cable to expose a plurality of cable strands, and applying a sealant to the cable strands such that the sealant is drawn under the insulator and fills in gaps between the cable strands by capillary action.

10 Claims, 2 Drawing Sheets

SEALED CABLE AND TERMINAL CRIMP

BACKGROUND

Insulated cables are used to provide electrical communication to many devices. Often times, these cables include stranded copper, which has high conductivity, good corrosion resistance, and adequate mechanical strength. However, interest in weight savings and cost savings has increased interest in aluminum-based stranded cable instead of copper. However, aluminum-based cable has different properties, including conductivity, strength, and fatigue life. Perhaps more importantly, copper and aluminum-based cables have different corrosion resistance properties. For example, copper is resistant to salt and other corrosive chemicals while aluminum is resistant to atmospheric corrosion, but is susceptible to localized pitting and crevice corrosion if corrosive liquids enter gaps between the cable strands. Aluminum-based cables crimped to copper alloy or other electrical terminals are also susceptible to galvanic corrosion if an electrolyte is present.

A variety of circumstances may cause the cables to corrode faster than cables that are not exposed to such circumstances. For example, cables that are in high humidity areas or that are exposed to various environmental conditions, such as rain or snow, are more susceptible to corrosion. In geographic areas where road salt is used to melt ice, stranded cables disposed underneath carpets are especially susceptible to corrosion. Therefore, a sealant may be used to keep electrolytes, like saltwater, from making contact with aluminum-based cables to minimize corrosion. However, it is often difficult for the sealant to coat cables due to small gaps between the cable strands.

Accordingly, an aluminum-based cable is needed that has improved corrosion resistance for the cable strands and/or electrical terminals. Moreover, a method of sealing the cable, including gaps between the cable strands, is needed.

BRIEF SUMMARY

A cable includes a plurality of cable strands, an insulator disposed on a portion of the plurality of strands such that the plurality of strands are at least partially exposed, and a sealant disposed between gaps of the plurality of strands and at least partially under the insulator.

Moreover, a method includes stripping an insulator from an end of a cable to expose a plurality of cable strands, and applying a sealant to the cable strands such that the sealant is drawn under the insulator and fills in gaps between the cable strands by capillary action.

DETAILED DESCRIPTION

A cable includes a plurality of cable strands disposed inside an insulator. The insulator is stripped so that the cable strands are at least partially exposed. A sealant is applied to the cable strands, and the sealant is drawn under the insulator and fills in gaps between the cable strands by capillary action. Capillary action is the ability of the cable strands and insulator to wick the sealant from one place to another. Specifically, capillary action may cause the sealant to wick from one end of the cable to another end. Alternatively, capillary action may simply cause the sealant to wick from one end of the cable to at least partially under the insulator. Accordingly, the sealant is able to coat more of the cable strands and further protect the cable strands from corrosion. Additionally, filling the gaps between the cable strands with the sealant prevents the ingress of corrosive liquids.

Figure 1:
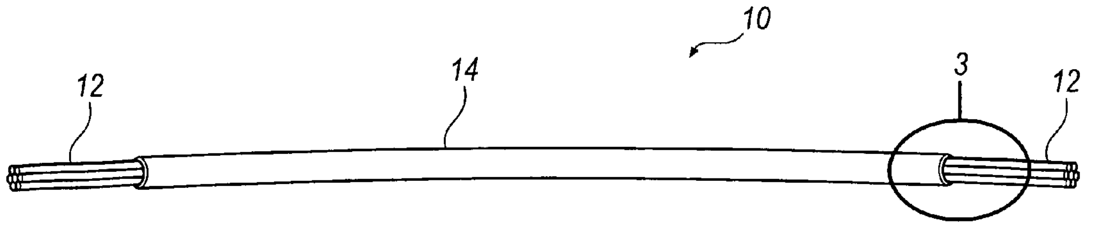
FIG. 1 is an exemplary side view of a cable having a plurality of cable strands and a sealant disposed thereon, according to an embodiment.

FIG. 1 illustrates an exemplary cable 10 that includes a plurality of aluminum-based or other types of cable strands 12 disposed within an insulator 14. The insulator 14 may be formed from plastic and have a tube-shaped configuration defining an opening, and the cable strands 12 are disposed within the opening. As illustrated, a portion of the insulator 14 has been stripped to expose the cable strands 12. It is to be appreciated that both ends of the cable 10 may be stripped to expose the strands 12 on both sides of the cable 10.

Figure 2:
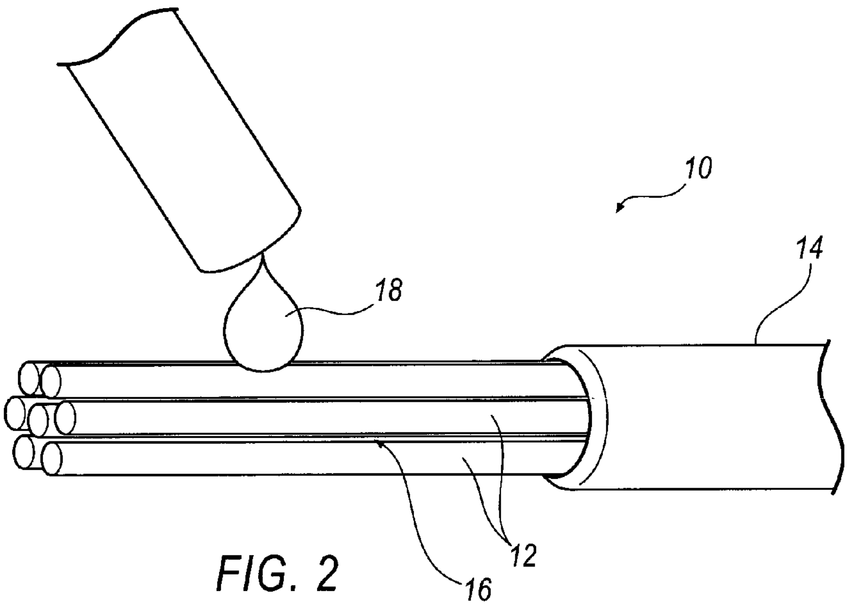
FIG. 2 is an exemplary side view of the exemplary cable wherein the sealant is applied to the plurality of cable strands, according to an embodiment.

Referring to FIG. 2, there may be very small gaps 16 between each of the cable strands 12, and to prevent corrosion, a sealant 18 is disposed in the gaps 16 of the plurality of strands 12 and at least partially under the insulator 14. Various types of sealants 18 having different properties may be used. In one exemplary approach, the sealant 18 has good wetting properties, is compatible with the material used to make the cable strands 12, has long-term stability in the environment in which it is used, and is compatible with crimped connections. Some examples of sealants 18 that may be used with aluminum-based or other types of cable strands 12 include an aerobic or anaerobic adhesive, a wax or wax-based compound, a silicone-based conformal compound, a urethane-based conformal coating, an organic solderability preservative, an oil, or a grease. Moreover, each of these materials may be mixed with a zinc or magnesium powder to help minimize corrosion by acting as sacrificial anodes.

The sealant 18 is applied to the cable strands 12, and capillary action causes the sealant 18 to flow into and fill the gaps 16 between the strands 12 and under at least a portion of the insulator 14. In one exemplary approach, the sealant 18 may wick from one end of the cable 10 to another end. Alternatively, the sealant 18 may flow to a position a few millimeters under the insulator 14 and, in one exemplary approach, up to approximately 100 mm from the end of the cable strands 12. How much the sealant 18 flows depends on various circumstances, including the viscosity of the sealant 18, the size the gaps 16 between the strands 12, the volume of sealant 18 applied, and/or the size of the insulator 14.

Figure 3:
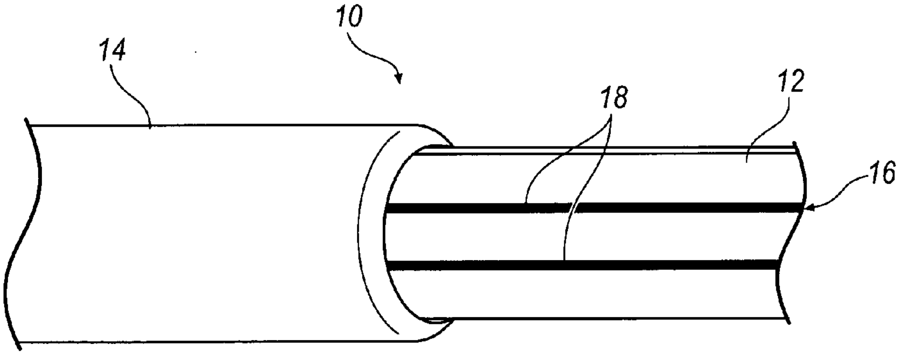
FIG. 3 is an exemplary side view of the exemplary cable wherein the sealant is drawn under an insulator and into gaps between the plurality of cable strands by capillary action, according to an embodiment.

FIG. 2 illustrates the sealant 18 being applied to the cable strands 12. In one exemplary approach, the sealant 18 may be dripped onto the cable strands 12, although the sealant 18 may be applied with different techniques, including spraying, electrolytic transfer, and brush or sponge applications. FIG. 3 is a close-up view of the end of the cable 10 after the sealant 18 is drawn under the insulator 14 and fills the gaps 16 between the cable strands 12 to the other end of the cable 10 via capillary action. It is to be appreciated that the sealant 18 need not be drawn all the way to the other end of the cable 10. It may be sufficient that the sealant 18 be drawn at least partially under the insulator 14.

Figure 4:
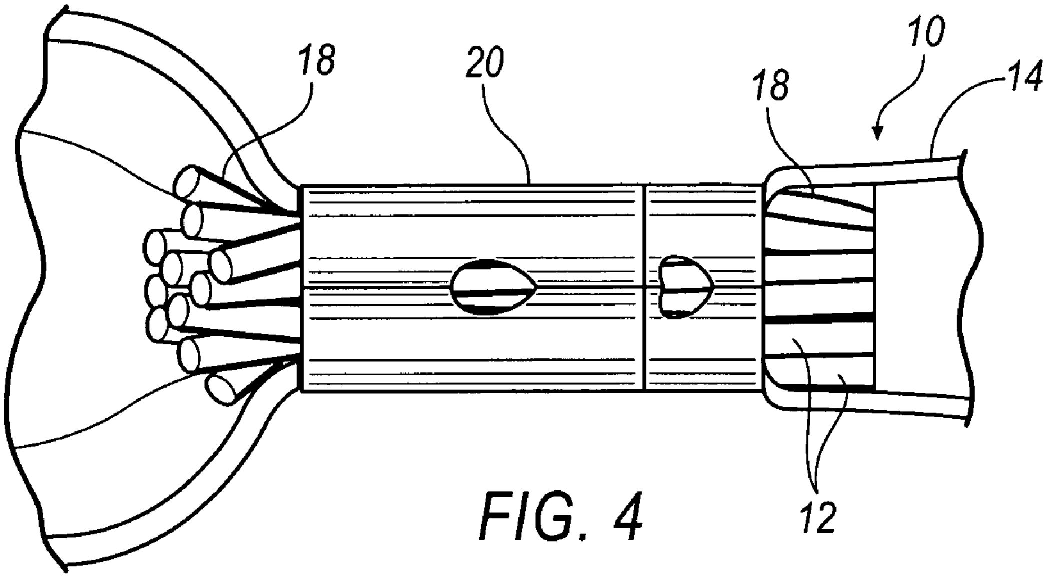
FIG. 4 is an exemplary side view of a terminal crimped onto the cable and wherein the sealant is applied to the plurality of cable strands and the terminal, according to an embodiment.

Referring to FIG. 4, in one embodiment, the cable strands 12 may be crimped to a terminal 20, and the sealant 18 may be applied either before or after crimping the terminal 20 onto the cable strands 12. If the sealant 18 is applied after, capillary action also causes the sealant 18 to flow underneath the terminal 20 to fill gaps 16 between the cable strands 12 and under at least a portion of the terminal 20.

Figure 5:
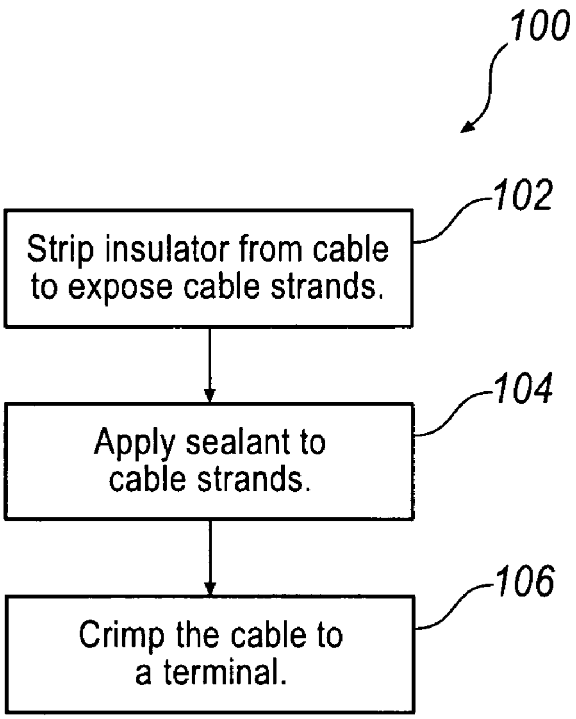
FIG. 5 is a flowchart of a method of sealing the cable, according to an embodiment.

Referring to FIG. 5, a method 100 of sealing the cable 10 includes a step 102 of stripping the insulator 14 from the end of the cable 10 to expose the plurality of cable strands 12. Then, the method 100 includes a step 104 of applying a sealant 18 to the cable strands 12 such that the sealant 18 is drawn under the insulator 14 and fills in the gaps 16 between the cable strands 12 by capillary action. As previously discussed, there are many ways that the sealant 18 may be applied, including spraying, electrolytic transfer, and brush or sponge applications. Moreover, the sealant 18 may be applied manually or automatically and in either high or low volume applications. Furthermore, the sealant 18 may be applied in multiple applications or coats using one or more of these techniques. Either before or after the step 104 of applying the sealant 18, the method 100 may include a step 106 of crimping the cable 10 to the terminal 20.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A cable comprising:

a plurality of cable strands;

an insulator disposed on an insulated portion of said plurality of strands, said insulator configured to leave an exposed portion of said plurality of strands uncovered by said insulator;

a terminal crimped to said exposed portion of said plurality of cable strands; and a sealant coating the entire length of said exposed portion of said plurality of strands and filling gaps formed between said exposed portion and at least a portion of said insulated portion of said plurality of strands, whereby said sealant intimately contacts and substantially fills any space and gaps around said exposed portion of said plurality of cable strands effectively preventing corrosive liquids from contacting said exposed portion of said plurality of strands.

2. The cable as set forth in claim 1, wherein said plurality of cable strands comprises aluminum or an aluminum-based alloy.

3. The cable as set forth in claim 2, wherein said sealant comprises a urethane based conformal coating.

4. The cable as set forth in claim 2, wherein said sealant comprises a wax or wax-based compound.

5. The cable as set forth in claim 2, wherein said sealant comprises an organic solderability preservative.

6. The cable as set forth in claim 2, wherein said sealant comprises an oil.

7. A cable comprising:

a plurality of cable strands;

an insulator disposed on an insulated portion of said plurality of strands, said insulator configured to leave an exposed portion of said plurality of strands uncovered by said insulator;

a sealant coating the entire length of said exposed portion of said plurality of strands and filling gaps formed between said exposed portion and at least a portion of said insulated portion of said plurality of strands, and a terminal crimped to said exposed portion of said plurality of cable strands and said sealant, whereby said sealant intimately contacts and substantially fills any space and gaps around said exposed portion of said plurality of cable strands effectively preventing corrosive liquids from contacting said exposed portion of said plurality of strands.

8. The cable as set forth in claim 7, wherein said plurality of cable strands comprises aluminum or an aluminum-based alloy.

9. The cable as set forth in claim 8, wherein said sealant includes at least one of a wax or wax-based compound, a urethane-based conformal coating, an organic solderability preservative, and an oil.

10. The cable as set forth in claim 8, wherein said sealant is mixed with at least one of a zinc powder and a magnesium powder.

* * * * *